US012579856B2

(12) United States Patent
Brillon et al.

(10) Patent No.: US 12,579,856 B2
(45) Date of Patent: Mar. 17, 2026

(54) ULTRA-WIDEBAND-BASED METHOD FOR ACTIVATING A FUNCTION OF A VEHICLE WITH A PORTABLE USER EQUIPMENT ITEM, ASSOCIATED SYSTEM AND DEVICE FOR ACTIVATING A FUNCTION

(71) Applicant: Continental Automotive Technologies GmbH, Hannover (DE)

(72) Inventors: Alain Brillon, Villeneuve-Tolosane (FR); Mohamed Cheikh, Toulouse (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 47 days.

(21) Appl. No.: 18/700,869

(22) PCT Filed: Oct. 11, 2022

(86) PCT No.: PCT/EP2022/078312
§ 371 (c)(1),
(2) Date: Apr. 12, 2024

(87) PCT Pub. No.: WO2023/066736
PCT Pub. Date: Apr. 27, 2023

(65) Prior Publication Data
US 2024/0412577 A1 Dec. 12, 2024

(30) Foreign Application Priority Data
Oct. 20, 2021 (FR) ........................................ 2111132

(51) Int. Cl.
*G07C 9/00* (2020.01)
*G01S 5/02* (2010.01)

(52) U.S. Cl.
CPC ........ *G07C 9/00309* (2013.01); *G01S 5/0273* (2013.01); *G07C 2209/63* (2013.01)

(58) Field of Classification Search
None
See application file for complete search history.

(56) References Cited

U.S. PATENT DOCUMENTS

| | | | |
|---|---|---|---|
| 12,339,386 B2 * | 6/2025 | Lim ................... | G01S 13/0209 |
| 2020/0082653 A1 | 3/2020 | Hazebrouck et al. | |
| 2020/0398787 A1 | 12/2020 | Kong et al. | |

OTHER PUBLICATIONS

International Search Report (PCT/ISA/210) with translation and Written Opinion (PCT/ISA/237) mailed Feb. 9, 2023, by the European Patent Office as the International Searching Authority for International Application No. PCT/EP2022/078312. (12 pages).

* cited by examiner

*Primary Examiner* — Carlos Garcia
(74) *Attorney, Agent, or Firm* — Buchanan Ingersoll & Rooney PC

(57) ABSTRACT

A method for activating a vehicle function via ultra-wideband communication by an item of portable user equipment. The device includes a plurality of transceivers, the vehicle function activated depending on a position of the item of portable equipment with respect to a boundary between two authorization zones, an internal zone inside and an external zone outside the vehicle. The method includes: determining the presence of the item of portable equipment in an authorization zone; if the item of portable equipment is located in an authorization zone at a distance from the boundary smaller than a predetermined distance, then: determining that the item of portable equipment is present in a predetermined sub-zone, with which has been associated beforehand two types of transceivers, a first type having at least one signal parameter representative of a direct path of waves and a second type having at least one signal parameter
(Continued)

representative of an indirect path of waves, weighting a number of measurements carried out for each transceiver according to its type, and determining the position of the item of portable equipment based on the measurements thus weighted, and activating the vehicle function corresponding to the position of the item of portable equipment.

14 Claims, 3 Drawing Sheets

ULTRA-WIDEBAND-BASED METHOD FOR ACTIVATING A FUNCTION OF A VEHICLE WITH A PORTABLE USER EQUIPMENT ITEM, ASSOCIATED SYSTEM AND DEVICE FOR ACTIVATING A FUNCTION

CROSS REFERENCE TO RELATED APPLICATIONS

This application is the U.S. National Phase Application of PCT International Application No. PCT/EP2022/078312, filed Oct. 11, 2022, which claims priority to French Patent Application No. 2111132, filed Oct. 20, 2021, the contents of such applications being incorporated by reference herein.

FIELD OF THE INVENTION

The invention relates to a method for activating a function of a motor vehicle via ultra-wideband (UWB) using an item of portable user equipment, and to an associated system and device for activating a function.

The invention more specifically applies to "hands-free" systems for accessing and/or starting motor vehicles. A "hands-free" system for accessing a motor vehicle allows an authorized user to lock and/or unlock the doors of her or his vehicle or to start the vehicle without manipulating a key. To this end, the vehicle identifies an item of portable equipment such as a hands-free key card or key carried by the user and if the key card or remote control is located in a predetermined zone around the vehicle or in the vehicle and is identified as belonging to the vehicle, then the vehicle automatically locks/unlocks its doors or starts depending on the intention of the user, without the user having to use a remote key.

BACKGROUND OF THE INVENTION

Such "hands-free" access systems are known to those skilled in the art. They are generally made up of an electronic control unit located on board the vehicle, of one or more radio-frequency (RF) antennas located in the vehicle, and of a key card or remote control comprising an RF antenna carried by the user.

Exchange of an identifier between the item of portable equipment and the vehicle via the RF antennas and the electronic control unit allows the item of portable equipment to be identified and located by the vehicle and locking or unlocking of the doors (including the trunk lid) or start-up of the vehicle to be triggered.

The identifier may be contained in an item of portable equipment other than a key card or remote control; for example, it may be contained in a smartphone carried by the user, or in a watch worn by the user.

The identifier is generally exchanged via radio-frequency (RF) waves and via low-frequency (or LF) waves. The vehicle transmits, firstly via the LF antennas, an LF polling signal, and the item of portable equipment, if it is located in the reception zone of said signal (i.e., a predetermined zone around the vehicle), returns to the vehicle an RF presence message containing its identifier and measurements allowing it to be located.

The precise location of the item of portable equipment around the vehicle is found by measuring the strength of the LF signal received by the item of portable equipment (via the antennas and the electronic control unit) from the vehicle, the strength measurements more commonly being called RSSI measurements (RSSI standing for Received Signal Strength Indication). The measurement of the power of the signal received by the item of portable equipment from each LF antenna is received and analyzed by a locating device installed in the vehicle, which thus determines the position of the item of portable equipment with respect to said LF antennas, i.e. with respect to the vehicle.

Depending on the location of the item of portable equipment identified by the vehicle, in said location zones, certain actions specific to said location zones are automatically carried out, such as starting the vehicle, unlocking/locking the vehicle or turning on welcome lighting.

The RSSI measurement allows the item of portable equipment to be precisely located in the location zones, i.e., around and inside the vehicle, in order to allow not only the doors to be locked/unlocked, but also the vehicle to be started, when the item of portable equipment is detected inside the vehicle.

In the case where the item of portable equipment is a smartphone, RF (for example in the ISM bands) and LF (for example at 125 kHz) communication with the vehicle is not always possible since most smartphones do not possess RF or LF communication means the frequencies of which are compatible with those used when communicating with a vehicle, such as the frequencies of 315 MHz and of 433.92 MHz when it is a question of RF and of 125 kHz when it is a question of LF.

In contrast, smartphones are nowadays able to employ the Bluetooth® or BLE communication standard (BLE standing for Bluetooth Low Energy), i.e., ultra-high frequency (UHF) communication from 2402 MHz to 2480 MHz, or even the UWB communication standard (UWB standing for Ultra-WideBand), i.e., a short-range wireless communication protocol (IEEE 802.15.4a) that allows a very wide frequency band to be used. Like Bluetooth and Wi-Fi, this communication protocol uses radio waves, but at a very-high frequency—it includes 14 communication channels each of 500 MHz bandwidth, in the frequency range extending from 3.1 GHz to 10.6 GHz. In the UWB protocol, pulse duration is two nanoseconds.

These communication standards, i.e. BLE, Bluetooth and UWB, have the advantage of being universal and therefore of not requiring country-specific approval (only international BLE or UWB certification), as is the case with current RF and LF communication standards the operating frequency of which differs from country to country.

Therefore, "hands-free" systems for accessing and/or starting a vehicle need to be configured so that they can also operate with a smartphone equipped with the Bluetooth® or UWB communication standard, and not only via radio-frequency and low-frequency waves (RF, LF).

The advantage of the Bluetooth® communication standard is that it allows long-range communication over about 250 m around the vehicle. However, it does not allow the presence of the item of portable equipment to be accurately detected at shorter distances. For example, when the item of portable equipment is located inside the vehicle and the user wishes to start her or his vehicle, the accurate location of the item of portable equipment that was possible with prior-art communication devices employing exchange of RF and LF waves, is no longer possible with Bluetooth®. Specifically, RSSI measurement of a Bluetooth signal is very inaccurate and varies enormously depending on the environment (noise, interference) and it is thus not possible to know whether the item of portable equipment, of given position, is 5 m, or 10 m or 40 m or more from the vehicle.

Therefore, it is no longer possible to activate a function such as start-up of the vehicle using Bluetooth® communication, since start-up must be permitted only when the item of portable equipment is located inside the vehicle, and a few centimeters from the UHF antennas of the vehicle. Given the large variation in the RSSI of Bluetooth®, it is not possible to locate said item of portable equipment to within a few centimeters of the UHF antennas.

The UWB communication standard for its part allows more accurate location than can be achieved with the Bluetooth standard, and consumes less power. It is known in the prior art to use the power of the UWB signal, short pulses being emitted in order to measure the distance between the item of portable equipment and the vehicle.

One prior-art solution consists in using time of flight, allowing the propagation time of the waves to be estimated, and the distance between the item of portable equipment and the vehicle to be deduced therefrom.

However, this solution has a major drawback due to the period at which the UWB signal is sampled or acquired by the electronic components located in the vehicle, which is 1 GHZ, i.e. a period of 1 nanosecond, this being equivalent to a spatial resolution of 30 cm.

The item of portable equipment is therefore located around or in the vehicle with a tolerance of 30 cm, this being unacceptable when it is a question of permitting the vehicle to be started since then start-up may then be permitted while the item of portable equipment is in fact located outside the predetermined zone delineating the passenger compartment and permitting start-up.

In addition, this tolerance of 30 cm does not meet the Thatcham rules, which specify a maximum tolerance of 20 cm. More precisely, according to these rules, the vehicle is no longer permitted to start if the item of portable equipment is located at a distance of 20 cm outside the vehicle.

Another known prior-art solution consists in multiplying the number of measurements, but this is time-consuming and undesirable from the point of view of user comfort, the user expecting a vehicle function to activate within a given time.

SUMMARY OF THE INVENTION

An aspect of the invention provides a method for activating a function of a vehicle via ultra-wideband communication with an item of portable user equipment, and a device for activating an associated function, that allow these drawbacks to be overcome.

More specifically, an aspect of the invention provides a method for activating a function via ultra-wideband waves that allows the item of portable user equipment to be more precisely located inside or outside the vehicle.

An aspect of the invention consists of a method for activating a vehicle function via ultra-wideband communication by an item of portable user equipment communicating via ultra-wideband with an activating device located on board the vehicle, said device comprising a plurality of transceivers, the vehicle function being activated depending on a position of the item of portable equipment with respect to a boundary between two authorization zones, an internal zone inside and an external zone outside the vehicle, the activating method being noteworthy in that it comprises the following steps:
- a. determining the presence of the item of portable equipment in an authorization zone around the vehicle,
- b. if the item of portable equipment is located in an authorization zone at a distance from the boundary smaller than a predetermined distance, then:

- i. determining that the item of portable equipment is present in a predetermined sub-zone, with which has been associated beforehand two types of transceivers among the plurality, a first type having at least one signal parameter representative of a direct path of waves between said first type and the item of portable user equipment, and a second type having at least one signal parameter representative of an indirect path of waves between said second type and the item of portable user equipment,
- ii. weighting a number of measurements carried out for each transceiver according to its type,
- iii. determining the position of the item of portable equipment in the internal zone or in the external zone based on measurements thus weighted by type of transceiver,
- iv. activating the vehicle function corresponding to the position of the item of portable equipment,
- c. otherwise, activating the vehicle function corresponding to the authorization zone.

Preferably, the weighting is carried out with a maximum number of measurements carried out for the plurality of transceivers.

The signal parameter may correspond to a time of flight.

The signal parameter may be a received signal strength indicator.

Advantageously, the predetermined distance corresponds to an ultra-wideband location accuracy.

An aspect of the invention also relates to a device for activating a vehicle function via ultra-wideband, said device being intended to be located on board a vehicle and communicating via ultra-wideband with an item of portable user equipment, the vehicle function being activated depending on a position of the item of portable equipment with respect to a boundary between two authorization zones, an internal zone inside and an external zone outside the vehicle, said device comprising a plurality of transceivers and being noteworthy in that it comprises:
- a. means for determining a presence of the item of portable equipment in an authorization zone of the vehicle,
- b. means for analyzing and processing ultra-wideband signals, configured to:
  - i. compute a distance between a position of the item of portable equipment in the authorization zone and the boundary,
  - ii. compare said distance with a predetermined distance,
  - iii. determine that the item of portable equipment is present in a predetermined sub-zone, with which has been associated beforehand two types of transceivers among the plurality, a first type having a signal parameter representative of a direct path of waves between said first type and the item of portable equipment, and a second type having a signal parameter representative of an indirect path of waves between said second type and said item of equipment,
  - iv. weight a number of measurements for each transceiver according to its type,
  - v. determine the position of the item of portable equipment in the internal zone or in the external zone based on measurements thus weighted,
  - vi. activate the vehicle function corresponding to the position of the item of portable equipment.

Preferably, the device is able to weight, among a maximum number of measurements carried out for the plurality of transceivers, the number of measurements for each transceiver according to its type.

Advantageously, the signal parameter is a time of flight.

Otherwise, the signal parameter is a received signal strength indicator.

An aspect of the invention also applies to any motor vehicle comprising an activating device having any one of the features listed above.

BRIEF DESCRIPTION OF THE DRAWINGS

Further features and advantages of aspects of the invention will become more clearly apparent on reading the following description. This description is purely illustrative and should be read in conjunction with the appended drawings, in which.

DETAILED DESCRIPTION OF THE PREFERRED EMBODIMENTS

Figure 1:
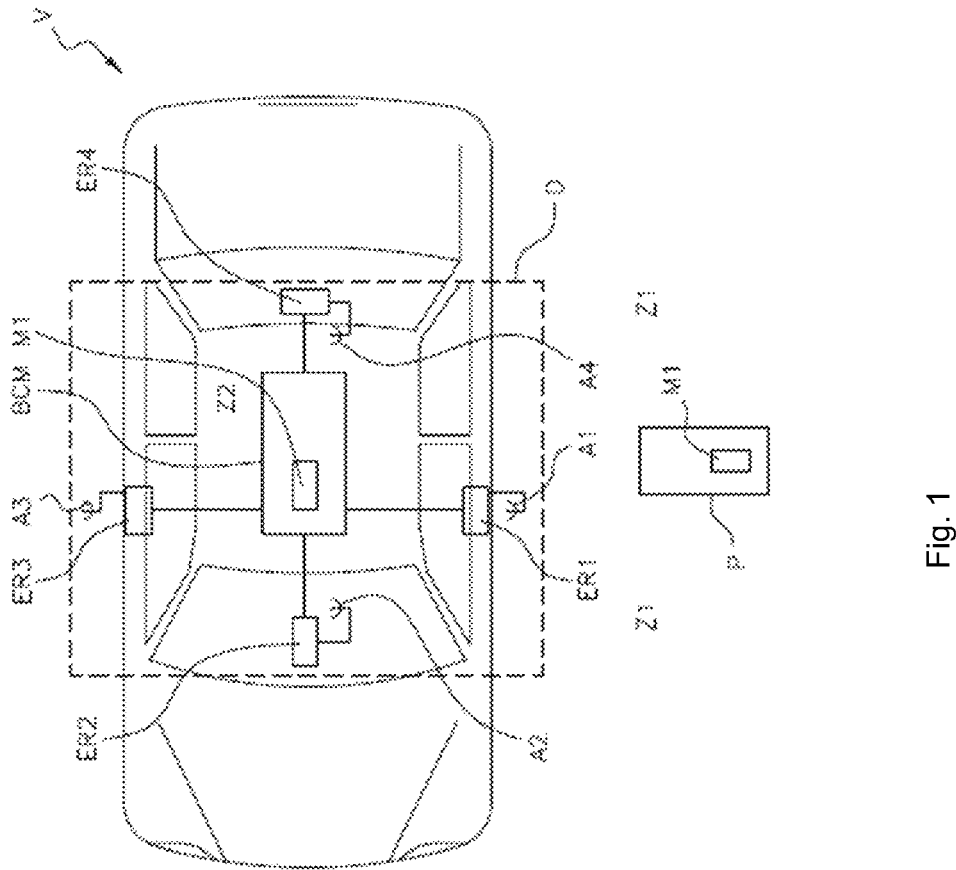
FIG. 1 schematically shows a vehicle equipped with the device for activating a vehicle function according to an aspect of the invention.

FIG. 1, which is according to an aspect of the invention, schematically shows a motor vehicle V, equipped with a device D for activating a vehicle function capable of communicating via UWB communication with an item of portable user equipment P and of precisely locating said item of portable equipment around the vehicle V via UWB communication, said device D comprising:

a. a first module ER1 for transmitting/receiving UWB signals, comprising a first external UWB antenna A1, b. a second module ER2 for transmitting/receiving UWB signals, comprising a first internal UWB antenna A2, c. a third module ER3 for transmitting/receiving UWB signals, comprising a second external UWB antenna A3, d. a fourth module ER4 for transmitting/receiving UWB signals, comprising a second internal UWB antenna A4, e. a body control module (BCM) electrically connected to the first and second modules.

The first module ER1, second module ER2, third module ER3 and fourth module ER4 are equipped with software means or electronic components allowing UWB signals to be transmitted and received via the first internal antenna A1, the first external antenna A2, the second internal antenna A3, and the second external antenna A4, respectively. The first and/or second and/or third and/or fourth modules ER1, ER2, ER3, ER4 may be combined into a single module and form a single module comprising the software means and/or electronic components allowing UWB signals to be transmitted and received via the four antennas A1, A2, A3, A4 and the transmission and reception by the four antennas A1, A2, A3, A4 to be controlled. Each antenna A1, A2, A3, A4 can be connected to a dedicated transmission/reception circuit, thus allowing the UWB signals to be transmitted and received in parallel by the four antennas, A1, A2, A3, A4, or, alternatively, a single transmission/reception circuit can be connected to the four antennas A1, A2, A3, A4 with a view to transmitting and receiving the UWB signals via the four antennas, the latter then operating in sequential mode. In the latter configuration, the transmission/reception circuit electrically switches from one antenna to another A1, A2, A3, A4 at a set frequency. This is known to those skilled in the art.

The internal antennas A2, A4 and external antennas A1, A3 are radio-frequency antennas that make it possible to transmit and receive UWB signals, i.e. signals in the frequency range located between 3 GHz and 10 GHz. By internal antenna A2, A4 what is meant is an antenna A2, A4 located inside the vehicle V, in the passenger compartment for example, or oriented toward the inside of the vehicle V. By external antenna A1, A3 what is meant is an antenna that is preferably located in or on the body of the vehicle V, i.e., that is located on the outer surface of the vehicle V or oriented toward the outside of the vehicle V.

The first, second, third and fourth modules ER1, ER2, ER3, ER4 may, for their part, be located anywhere in or on the vehicle V.

The body control module (BCM) for its part allows the signals received by the modules ER1, ER2, ER3, ER4 to be processed and also controls transmission of the signals to the item of portable equipment P, via the modules and associated external and internal antennas A1, A2, A3, A4.

The activating device D, which is intended to be located on board the vehicle V, allows the portable user device P to be precisely located with respect to the vehicle V, i.e., either in the internal zone Z2 or in the external zone Z1 of the vehicle V, in order to activate a function of the vehicle, and more precisely either to unlock it if the item of portable equipment P is located in the external zone Z1, or to start the engine of the vehicle if the item of portable user equipment P is located in the internal zone Z2.

The activating device D also comprises means M1 (see FIG. 1) for processing and analyzing the signals received via the four antennas A1, A2, A3, A4, which allow the location of the item of portable equipment P with respect to the vehicle to be determined and either the door to be unlocked, if the item of portable equipment is located outside the vehicle V (in the external zone Z1), or the engine of the vehicle V to be started, if the item of portable equipment P is located inside the vehicle V (i.e. in the internal zone Z2).

The device D also comprises means for determining whether the item of portable user equipment P is present in an authorization zone, i.e. either in the external zone Z1 outside or in the internal zone Z2 inside the vehicle V.

Now, as described above, the positioning tolerance of the item of portable equipment P when UWB technology is employed is about $d0=30$ cm. Therefore, when the item of portable equipment is located near a boundary F (cf. FIG. 2) between the two zones Z1, Z2, and more particularly when it is located at a distance d smaller than a predetermined distance corresponding to the positioning tolerance d0, i.e. when $d<d0=30$ cm from said boundary F, it is not possible to determine with certainty whether the item of portable equipment is located in the internal zone Z2 or external zone Z1.

The processing and analyzing means M1 may be contained either in the vehicle V, for example in the body control module BCM or in each of the four modules ER1, ER2, ER3, ER4, or in the item of portable equipment P, or in both. Said means M1 are connected to means for controlling unlocking and/or means for starting the vehicle V, which are generally located in the body control module BCM. Said body control module BCM controls the door-opening mechanism and/or the circuit for starting the vehicle V.

In the case where the processing and analyzing means M1 are also or solely located in the item of portable equipment P, an aspect of the invention then applies to the system consisting of the activating device D and of the item of portable equipment P. The presence of the processing and analyzing means M1 in the vehicle V and in the item of portable equipment P, i.e. said means M1 are duplicated, allows redundancy in the processing of the information and in the decision-making process.

In the case where the processing and analyzing means M1 are solely contained in the item of portable equipment P, then the vehicle actions are controlled only by said item of equipment P, which will, depending on the location of the item of portable equipment P, either ask the door-opening mechanism to unlock the vehicle V and/or ask the circuit for starting the vehicle V to start the vehicle V.

With the aim of improving the accuracy of the location of the item of portable equipment P with respect to the vehicle V, and as will be described below, the analyzing and processing means M1 are configured to:

i. compute a distance d between a position of the item of portable equipment P in the authorization zone and the boundary F, ii. compare said distance d with a predetermined distance $d0$, iii. determine that the item of portable equipment P is present in a predetermined sub-zone $SZ1i$, $SZ2i$, with which has been associated beforehand two types of transceivers among the plurality, a first type $ERi1$ having a signal parameter representative of a direct path of UWB waves between said first type of transceiver and the item of portable equipment P, and a second type $ERi2$ having a signal parameter representative of an indirect path of UWB waves between said second type of transceiver and said item of equipment P, iv. weight a number of measurements m, n for each transceiver ER1, ER2, ER3, ER4 according to the type $ERi1$, $ERi2$ thus determined, v. determine the position of the item of portable equipment P in the internal zone Z2 or in the external zone Z1 based on the number of measurements thus weighted, vi. activate the vehicle function corresponding to the position of the item of portable equipment P.

In one preferred embodiment of the activating device D, said device is able to weight, among a maximum number M of measurements carried out by the plurality of transceivers, a number of measurements m, n for each transceiver ER1, ER2, ER3, ER4 according to the type $ERi1$, $ERi2$ thus determined.

The analyzing and processing means M1 are for example software means.

The distance d computed between the position of the item of portable equipment in the authorization zone Z1, Z2 and the boundary F is preferably the shortest distance.

The predetermined distance $d0$ is for example, but non-limitingly, the distance corresponding to the UWB localization accuracy, i.e. $d0=30$ cm.

The sub-zones $SZ1i$, $SZ2i$ will have been determined beforehand in a calibrating phase, and they are located on either side of the boundary in a zone 60 cm wide, i.e. 30 cm on either side of the boundary F.

In this preliminary calibrating phase, two types of transceivers $ERi1$, $ERi2$ among the plurality of transceivers with which the item of portable equipment P is capable of communicating with are assigned or classified for each sub-zone $SZ1i$, $SZ2i$.

A first type $ERi1$ having a communication signal parameter representative of a direct path of UWB waves between said first type of transceiver and the item of portable equipment P.

A second type $ERi2$ having a parameter of the communication signal representative of an indirect path of UWB waves between said second type of transceiver and the item of portable equipment P.

By parameter what is meant is at least one or more parameters of the communication signal exchanged between the antennas A1, A2, A3, A4 and the item of portable equipment P.

In the case where location is determined through use of a signal parameter such as the received signal strength indicator (RSSI) of the UWB signal, then the first type of transceiver $ERi1$ has, for example, an RSSI greater than a threshold value, and the second type of transceiver $ERi2$ has an RSSI lower than the threshold value. The signals sent by the first type of transceiver $ERi1$ are therefore more powerful and more direct and allow the item of portable equipment P to be located faster and more precisely than the signals sent by the second type $ERi2$.

In the case where location is determined through a signal parameter such as time of flight (TOF), then the first type of transceiver $ERi1$ has a time of flight shorter than the time of flight of the second type of transceiver $ERi2$. Thus, the signals sent by the first type of transceiver $ERi1$ represent the fastest, shortest and therefore most direct paths: they are less likely to have undergone reflections, and are therefore more reliable in respect of quickly and accurately locating the item of portable equipment P than the signals sent by the second type $ERi2$, which arrive later.

The method for activating a vehicle function according to an aspect of the invention will now be described with reference to the flowchart of FIG. 3, and with the support of FIGS. 1 and 2.

In an initial step E0, the vehicle V recurrently transmits UWB signals in order to detect the presence of an item of portable equipment P around the vehicle V, in one of the authorization zones Z1, Z2. This transmission process is also called "polling". To this end, the body control module BCM commands transmission of UWB signals via the modules ER1, ER3 and the associated external antennas A1, A3.

The UWB signals are then received by the item of portable equipment P. UWB locating methods are known to those skilled in the art and may consist in using RSSI (acronym of Received Signal Strength Indicator) or the power of the signals received by the item of portable equipment P, or in using the time of flight of the UWB signals between the vehicle and the item of portable equipment P, which is correlated with the distance therebetween. These two methods, which allow the distance separating the item of portable equipment P from the vehicle to be determined, are known to those skilled in the art and will not be described in more detail here.

Of course, an aspect of the invention applies to any locating process or method using other parameters or combinations of parameters derived from the UWB signal and allowing the position of the item of portable equipment P with respect to the vehicle V to be determined.

In the case where the item of portable equipment P is detected in one of the zones, either Z1 or Z2, then the method passes to the following step E1; otherwise the method returns to the initial step E0.

In the following step E1, the distance d between the item of portable equipment P and the boundary F (cf. FIG. 2) between the two zones Z1, Z2 is compared with a predetermined distance d0. The predetermined distance d0 is for example, by way of illustration for this example and completely non-limitingly, substantially equal to the UWB locating or positioning tolerance, i.e. d0=30 cm.

If the distance d is smaller than the predetermined distance d0, then the method passes to the following step E2; otherwise, the item of portable equipment is considered to be found with satisfactory certainty (since outside the positional tolerance) either in the internal zone Z2 or in the external zone Z1, depending on the determined location, and the function corresponding to the zone, either F1 for unlocking (or locking), or F2 (start-up) may then be activated (cf. step E6).

In the case where the distance d is smaller than the predetermined distance d0, this means that the item of portable equipment P is located near the boundary F, and that it cannot be located with certainty either in one or in the other of the two zones Z1, Z2. In this case, the method executes the following step, step E2, which consists in locating the item of portable equipment P in a sub-zone SZ1$i$, SZ2$i$ belonging to one of the two authorization zones Z1, Z2.

To this end, the two authorization zones Z1, Z2 will each have been divided beforehand into a plurality of sub-zones SZ1$i$, SZ2$i$ (see FIG. 2) in a strip of width, on either side of the boundary F, that is for example equal to twice the tolerance do.

Figure 2:
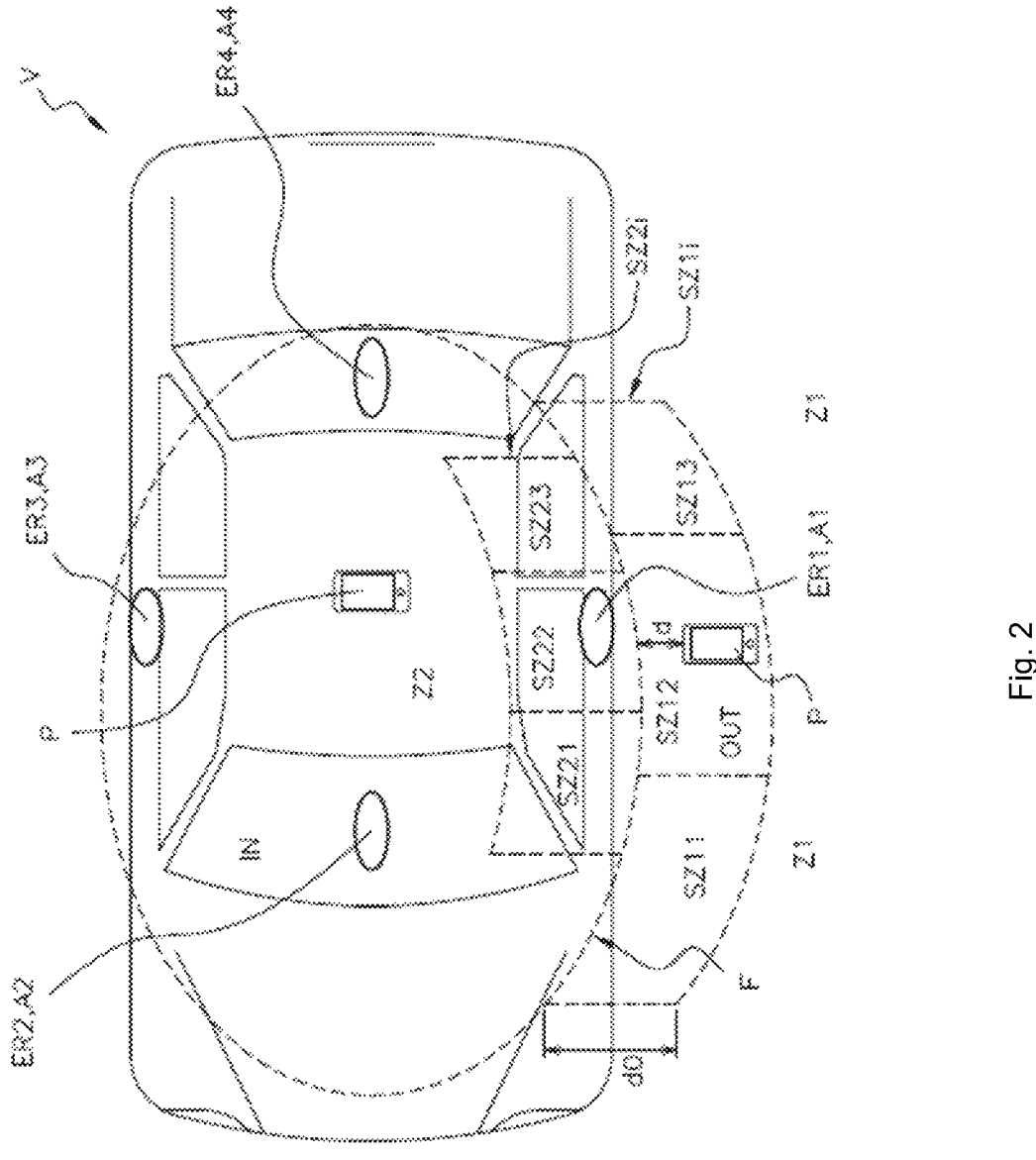
FIG. 2 schematically shows the limit between the internal zone and the external zone for locating the item of portable equipment with respect to the vehicle.
Figure 3:
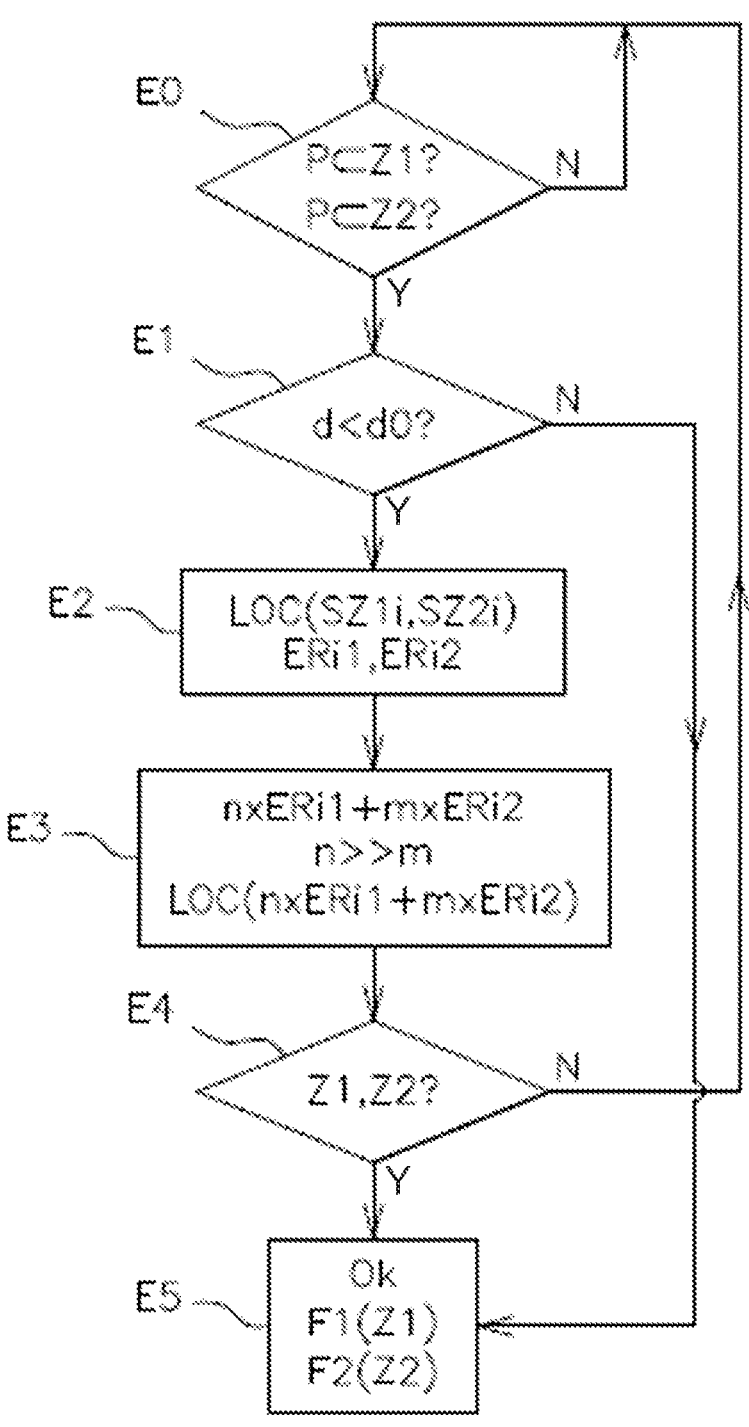
FIG. 3 is a flow chart showing the activating method according to an aspect of the invention.

Thus, as illustrated in FIG. 2, the item of portable equipment P is located in sub-zone SZ12 of the external zone Z1.

As explained above, the locating method is known to those skilled in the art and will not be described in detail here.

Beforehand, with each of the sub-zones SZ1$i$, SZ2$i$, there will also have been associated two types of transceiver ERi1, ERi2:

a. a first type ERi1 having a signal parameter representative of a direct path of UWB waves, b. a second type ERi2 having a signal parameter representative of an indirect path of UWB waves.

By parameter of the signal, what is meant here is any parameter contained in the UWB signals exchanged between the vehicle V and the item of portable user equipment P, or any other parameter obtained and derived from characteristics of the signal and relevant to locating said equipment P with respect to the vehicle V.

Thus, as explained above, the first type of transceiver ERi1 allows the item of portable equipment P to be located more reliably and more accurately, in the sub-zone SZ1$i$, SZ2$i$ with which it is associated, than the second type of transceiver ERi2.

Specifically, depending on the position of the item of portable equipment P with respect to the transceivers of the vehicle, and more particularly with respect to their associated antennas, they may not be visible to the item of equipment, or may send UWB signals that undergo many reflections and are attenuated. These transceivers (and their associated antennas) therefore belong to the second type of transceiver ERi2 as proposed by an aspect of the invention. In contrast, certain transceivers (i.e.: antennas) may be found directly facing the item of portable equipment P and thus send it UWB signals that undergo no degradation and that consequently allow the item of portable equipment P to be located faster and more accurately. These transceivers therefore belong to the first type of transceiver ERi1.

Said parameter may for example, by way of illustration and completely non-limitingly, be the time of flight of the signal, its RSSI, or any computed or derived value obtained from one or more parameters of the UWB signal.

Thus, for each sub-zone SZ1$i$, SZ2$i$, among the four transceivers ER1, ER2, ER3, ER4, certain belong to the first type ERi1, and others to the second type ERi2.

For example, in FIG. 2, the item of portable equipment P is located in sub-zone SZ12, with which is associated:

a. two transceivers of the first type ERi1, the first transceiver ER1 located facing the item of equipment P and the first internal transceiver ER2 located closer to the item of equipment P than the second internal transceiver E4, b. two transceivers of the second type ERi2, the second external transceiver ER3, which is located on the other side of the vehicle V from that on which the item of equipment P is located, and which is therefore further away from the item of portable equipment P, and the signals of which are greatly attenuated when they are received by said item of equipment, and the second internal transceiver ER4, which is further away from the item of portable equipment than the first internal transceiver ER2.

The transceivers are classified as being of first or second type by sub-zone in a preliminary calibrating phase.

During this preliminary phase, for example, in each sub-zone SZ1$i$, SZ2$i$ and for each transceiver ER1, ER2, ER3, ER4, the time of flight TOF between the transceiver and the item of portable equipment P located in the sub-zone is measured. Next, this time of flight TOF is converted into a distance and compared with the actual distance measured on the vehicle between the transceiver and the item of portable equipment P. Thus, it is possible to determine whether the wave received by the item of portable equipment P from the transceiver ER1, ER2, ER3, ER4 has followed a direct or indirect path. Specifically, if the distance obtained from the time of flight TOF corresponds (to within a tolerance) to the actual distance, then the wave has propagated directly and the transceiver can be classified among those of the first type ERi1. Conversely, if the distance obtained from the time of flight TOF is larger than the actual distance, then the wave has undergone reflections, i.e. it has propagated indirectly, and the transceiver may be classified among those of the second type ERi2.

Once the four transceivers have been classified as being of first or second type ERi1, ERi2 as a function of the sub-zone SZ1$i$, SZ2$i$ in which the item of portable equipment P is located, the method passes to the following step E3, which consists in weighting, in the location computation, the number of measurements depending on transceiver type ERi1, ERi2.

In one preferred embodiment of the method, this weighting of measurements is carried out with a maximum number M of measurements allocated to the plurality of transceivers.

According to an aspect of the invention, for example, a maximum number M of measurements is allocated to all the transceivers ER1, ER2, ER3, ER4 located on the vehicle V. For example M=8. In the prior-art method, since the number of measurements is the same for all the transceivers, this therefore amounts to performing two (8/4) measurements per transceiver in order to locate the item of portable equipment P. In addition, in the prior art, if the item of portable equipment P cannot be located with these eight measurements, then the measurements are repeated.

The method according to an aspect of the invention judiciously proposes to weight the number of measurements per transceiver ER1, ER2, ER3, ER4 depending on the transceiver type ERi1, ERi2 determined beforehand as a function of the sub-zone SZ1*i*, SZ2*i* in which the item of portable equipment P is located.

More precisely, according to an aspect of the invention, the locating method considers, in the location computations, a number n of measurements delivered by transceivers of the first type ERi1, that is higher than a number m of measurements delivered by transceivers of the second type ERi2. Thus n>>m, and in the preferred embodiment of the method, the sum of the n and m measurements is equal to the maximum number M of measurements allocated, i.e. n+m=M.

Thus, the locating method according to an aspect of the invention proposes to increase the number of measurements n delivered by transceivers of the first type ERi1 and to decrease the number of measurements m delivered by transceivers of the second type ERi2.

In the preferred embodiment, this is done while respecting a maximum number of measurements M for the entirety of the transceivers, i.e. while respecting a predetermined time limited to the time required to perform these 8 measurements.

Each measurement results from an exchange of signals between the transceiver ER1, ER2, ER3, ER4 and the item of portable equipment P.

Thus, according to an aspect of the invention, the item of portable equipment P is located more reliably and faster than in the prior art, since the measurements delivered by the most reliable transceivers are used predominantly with respect to the measurements delivered by the least reliable transceivers.

Once the location has been completed, it is then determined whether the item of portable equipment P is located in the internal zone Z1 or external zone Z2 (step E4).

Depending on the location of the item of portable user equipment P in one of the authorization zones, the corresponding function F1, F2 is then activated, i.e. unlocking or locking is activated if the item of equipment P is located in the external zone Z1, or start-up is activated if the item of equipment is located in the internal zone Z2.

The activating method according to an aspect of the invention therefore allows the item of portable equipment to be located more accurately, especially when it is located near the boundary between two authorization zones.

An aspect of the invention is particularly ingenious and inexpensive, because it essentially consists in software means and a preliminary calibrating phase.

The invention claimed is:

1. A method for activating a vehicle function via ultra-wideband—UWB—communication by an item of portable user equipment communicating via ultra-wideband with an activating device located on board the vehicle, said device comprising a plurality of transceivers, the vehicle function being activated depending on a position of the item of portable equipment with respect to a boundary between two authorization zones, an internal zone inside and an external zone outside the vehicle, the activating method comprising:
   a) determining a presence of the item of portable equipment in an authorization zone around the vehicle,
   b) if the item of portable equipment is located in an authorization zone at a distance from the boundary smaller than a predetermined distance, then:
      i) determining that the item of portable equipment is present in a predetermined sub-zone, with which has been associated beforehand two types of transceivers among the plurality, a first type having at least one signal parameter representative of a direct path of waves between said first type and the item of portable user equipment, and a second type having at least one signal parameter representative of an indirect path of waves between said second type and the item of portable user equipment,
      ii) weighting a number of measurements (m, n) carried out for each transceiver according to its type, said weighting of measurements being carried out with a maximum number of measurements allocated to the plurality of transceivers,
      iii) determining the position of the item of portable equipment in the internal zone or in the external zone based on measurements thus weighted by type of transceiver,
      iv) activating the vehicle function corresponding to the position of the item of portable equipment,
   c) otherwise, activating the vehicle function corresponding to the authorization zone.

2. The activating method as claimed in claim 1, wherein the signal parameter corresponds to a time of flight.

3. The activating method as claimed in claim 1, wherein the signal parameter is a received signal strength indicator.

4. The activating method as claimed in claim 1, wherein the predetermined distance corresponds to ultra-wideband location accuracy.

5. The activating method as claimed in claim 1, wherein the weighting is carried out with a maximum number of measurements carried out for the plurality of transceivers.

6. The activating method as claimed in claim 5, wherein the signal parameter corresponds to a time of flight.

7. The activating method as claimed in claim 5, wherein the signal parameter is a received signal strength indicator.

8. A device for activating a vehicle function via ultra-wideband—UWB—said device being intended to be located on board a vehicle and communicating via ultra-wideband with an item of portable user equipment, the vehicle function being activated depending on a position of the item of portable equipment with respect to a boundary between two authorization zones, an internal zone inside and an external zone outside the vehicle, said device comprising a plurality of transceivers and further comprising:
   d) means for determining a presence of the item of portable equipment in an authorization zone of the vehicle,
   e) means for analyzing and processing ultra-wideband signals, configured to:
      i) compute a distance between a position of the item of portable equipment in the authorization zone and the boundary,
      ii) compare said distance with a predetermined distance,
      iii) determine that the item of portable equipment is present in a predetermined sub-zone, with which has been associated beforehand two types of transceivers among the plurality, a first type having a signal parameter representative of a direct path of waves between said first type and the item of portable equipment, and a second type having a signal parameter representative of an indirect path of waves between said second type and said item of equipment,
      iv) weight a number of measurements for each transceiver according to its type,
      v) determine the position of the item of portable equipment in the internal zone or in the external zone based on measurements thus weighted, vi) activate the vehicle function corresponding to the
   position of the item of portable equipment.

9. The activating device as claimed in claim 8, wherein the signal parameter is a time of flight.

10. The activating device as claimed in claim 8, wherein the signal parameter is a received signal strength indicator.

11. A motor vehicle, comprising an activating device as claimed in claim 8.

12. The activating device as claimed in claim 8, wherein the means for analyzing and processing ultra-wideband signals are further configured to weight, among a maximum number of measurements carried out for the plurality of transceivers, the number of measurements for each transceiver according to its type.

13. The activating device as claimed in claim 12, wherein the signal parameter is a time of flight.

14. The activating device as claimed in claim 12, wherein the signal parameter is a received signal strength indicator.

* * * * *